(No Model.)
D. WILDE.
END GATE.
No. 600,567. Patented Mar. 15, 1898.
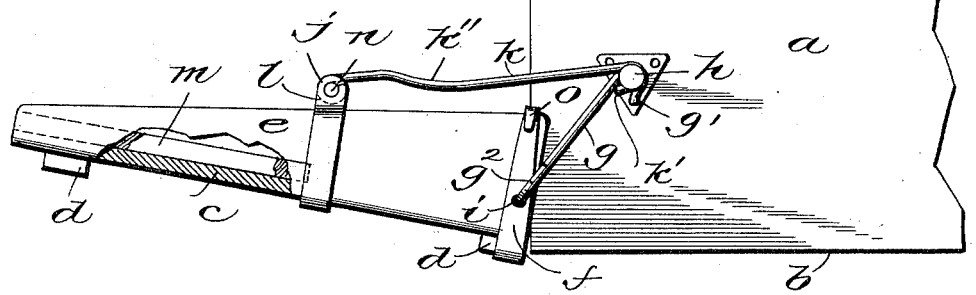
Fig. 1.
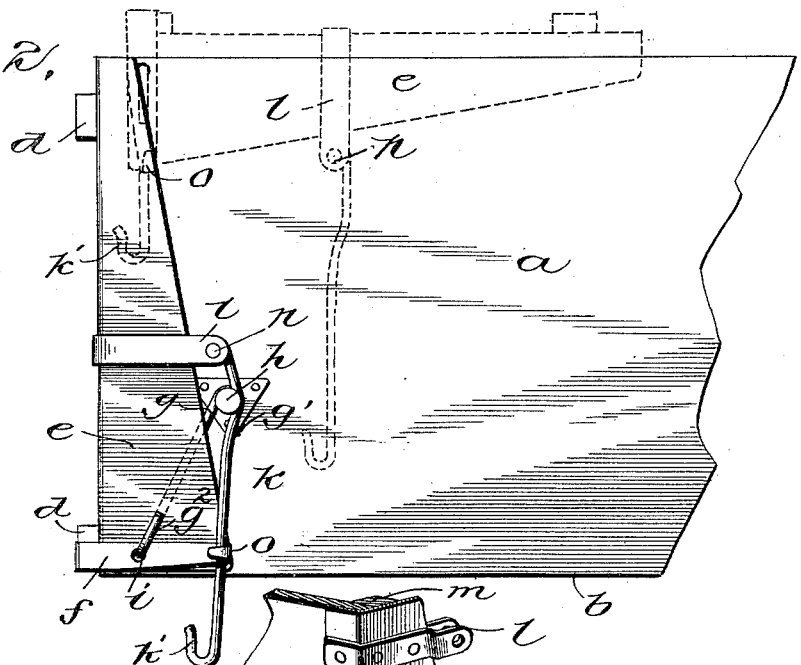
Fig. 2.
Fig. 3.
Witnesses
Inventor:
Daniel Wilde,
Attorney

UNITED STATES PATENT OFFICE.

DANIEL WILDE, OF WASHINGTON, IOWA.

END-GATE.

SPECIFICATION forming part of Letters Patent No. 600,567, dated March 15, 1898.

Application filed October 30, 1896. Serial No. 610,633. (No model.)

*To all whom it may concern:*

Be it known that I, DANIEL WILDE, a citizen of the United States, residing at Washington, in the county of Washington and State of Iowa, have invented certain new and useful Improvements in End-Gates; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to those end-gates for grain-wagons wherein the gate is hinged and supported by four hooks, two on each side at the top and bottom, so that the gate can be lowered to serve as a shoveling-board when removing the contents of the wagon.

It is becoming so common among farmers to haul their grain in wagons of the above class that many of the warehouses are now provided with what are commonly called "wagon-dumps," consisting of a specially-constructed driveway containing a tiltable platform and having a trap-door leading to a pit or bin below. The wagon is drawn upon this platform and its rear end stopped over the trap-door, and its contents are then deposited through the latter by first lowering the gate into shoveling position, then shoveling part of the load out of the rear end, and finally tilting the platform and wagon enough to let the grain run out into the pit.

The object of my invention is to attach the end-gate to grain-wagons in such a way that it will not only serve the purpose of a shoveling-board, but will permit the contents of the wagon to be unloaded directly into the pit or bin of such a driveway without the intervention of the shoveling operation.

To this end my invention consists in the peculiarly arranged and constructed locking and supporting hooks and their coöperating parts, all of which will be more fully described hereinafter and pointed out in the claims.

My invention further consists of constructing the supporting-rods in such a way as to provide convenient handles on the outside of the shoveling-board, by which the latter can be raised and the hooks on the rods freed from the studs on the wagon-body in one operation.

In the accompanying drawings, Figure 1 represents a side elevation of my complete invention, showing the position of the parts when the gate is down and open; Fig. 2, a similar view showing the gate up and closed, dotted lines showing the position of the parts when the gate is raised up and supported on top of the wagon-body for the purpose of enabling the contents of the box to be reached or dumped; and Fig. 3 is an enlarged detail view of one corner of the gate.

The reference-letter $a$ denotes the side, and $b$ the bed, of an ordinary wagon-body.

$c$ represents the floor of the end-gate. This floor is composed of a number of boards placed with the grain endwise in relation to the wagon's bed, so that the grain will extend in the direction the shovel moves while removing the contents of the wagon. Cross-pieces $d$ on the bottom of the gate help to strengthen it. The opposite edges of the gate-bottom are provided with side pieces $e$, formed, by preference, of pieces of sheet metal substantially rectangular in cross-section, which fit over the edges of the gate-bottom and overlap the sides of the wagon-body. These side flanges or pieces are substantially triangular in shape when viewed from the side of the wagon, being smallest at the top and widening as they extend toward the bottom.

$f$ represents a transverse strap attached to and fastening over the outer lower end of the gate side.

The gate is suspended and hinged by means of a pair of supporting-rods $g$, each of which consists of a straight rod of heavy wire bent to form a hook $g'$ at its upper end, lying parallel with the face of the side of the wagon-body, and a hook $g^2$ at its lower end, formed by bending the end of the rod back over itself and parallel thereto. The projection of the latter hook $g^2$ is designed to act as a handle in the manipulation of the rod $g$, as will be more fully explained hereinafter. The hook $g^2$ extends laterally at right angles to the upper hooks $g'$ and lies far enough away from the sides $e$ to permit it to be grasped by the hand when desired to release the hook $g'$ on the opposite end and simultaneously raise the board up and place it on the top of the sideboards, as seen in dotted lines in Fig. 2.

The upper end of each hook passes over pivots $h$, secured to the wagon side, and the lower end passes through a hole $i$ in the strap $f$ and the side piece $e$. Rods $g$ are given a length sufficient to permit the gate to be lowered, so that its bottom lies slightly above the bed of the wagon-body to prevent a shovel from coming in contact with the end of the bed.

The means for supporting and limiting the free end of the gate when lowered consists of a pair of hangers $k$, also formed of heavy round spring-steel wire and made longer than the rods $g$. The free end of each of the rods is provided with a hook $k'$, which catches over the pivots $h$, and the opposite end is attached to the sides of the gate by means of hinge-joints consisting of an eye $j$ on the end of the rod, which passes between upwardly-projecting prongs $l$, where it is held by means of a pin $n$. It will be seen that each pivot or stud $h$ serves as a common support for the free ends of each pair of rods $k$ and $g$, thereby dispensing with half the usual number of eyes employed on the wagon sides for such purpose. The prongs $l$ are formed out of flat pieces of iron riveted to the sides of the gate. To prevent the wagon-bed from spreading, I provide corner-cleats $m$, securely fastened in the corners formed by the side pieces and the floor. The hangers $k$ are made to perform the double duty of a lock and hanger. This is accomplished by arranging the hinge-joint on the gate at such a position from the pivots $h$ that when the gate is closed it will lie above them and bring the hanger inside the pivot. Now when the free or lower end of the hanger is sprung forward past a hook $o$, formed by a continuation of the strap $f$, the parts will become locked together, so that the gate cannot open.

Combined with the other features of my gate is that of allowing it to pass up over the top of the wagon-body, as shown in dotted lines in Fig. 2, for the purpose of removing it out of the way to gain access to the contents of the wagon-body when the gate is not needed. In adjusting the gate to such purpose the supporting-hooks are first detached from the pivots on the sides of the wagon-body, and in so detaching them the hooked ends $g^2$ are brought into use as handles to swing the hooks back clear of the pivots when the gate is lifted far enough. The long hangers are provided with a slight curvature $k''$ near their hinges for the purpose of receiving the pivots against which they are pressed when their free ends are bent back and locked behind the hooks $o$. This curvature is so shaped that if the shaking of the wagon by use should attempt to raise the gate the lock will become tighter and thus prevent further upward movement.

The operation of my device can be briefly described as follows: Assuming that the end gate is open, as seen in Fig. 1, and it is desired to close it, all that need be done is to lift and push forward its free end, thereby turning it on the pivoted supporting-rods $g$ until it reaches a vertical position against the ends of the side-boards, as seen in Fig. 2. In this operation the long hangers $k$ will have been moved endwise on the pivots $h$, gradually descending by their own weight until their hinges pass over the pivots and allow them to hang down into nearly vertical position, whereupon they can easily be pulled backward and locked behind the hooks $o$ to hold the gate securely closed. A reversal of these movements will be all that is necessary to lower the gate. To lift the gate up and out of the way and support it on top of the wagon side-boards, the supporting-rods $g$ must first be unhooked from the pivots $h$. This is done by raising the gate a sufficient distance to allow the hooks $g'$ to be swung back by the handles $g^2$. Then a continuation of the movement upward to bring the bottom of the gate up far enough to tip over upon the sides can easily be effected.

Among the advantages gained by my arrangement of the lower hooks is that when a wagon is to be unloaded on one of those driveways provided with a tiltable platform and trap-door all that need be done is to loosen the locking-hooks, whereupon the weight of the grain within will automatically swing the gate outward and upward, thereby leaving the bottom of the gate and end of the wagon-bed about eight inches apart. Through this aperture the grain runs out until all pressure on the board is removed. In this movement the lower rods $g$ form a support for the gate. The gate is then either entirely removed from the wagon or laid upon the top of the side-boards, as seen in dotted lines in Fig. 2. The platform on which the wagon rests being now tilted, will allow the remainder of the load to run down and out into the pit below. By this means I save the time usually consumed in shoveling away the rear portion of the load of grain preliminary to dumping it.

Another great advantage is gained by the curvature $k''$ in the locking hanger-rods $k$, which curvature opposes the upward vibration of the gate and maintains a snug joint around the gate to prevent the leakage of wheat which usually takes place in wagons of this class from the jarring caused by rough roads, which make the gate work up. In my device this cannot occur, because the upward movement of the gate is prevented by the curvature.

What I claim as new, and desire to secure by Letters Patent, is—

1. In an end-gate for wagons, a gate proper having side flanges adapted to overlap the end of the wagon, in combination with a pair of long rods for supporting the outer or free end of the gate, a pair of shorter supporting-rods for supporting the lower or inner end of the gate, the latter having their opposite ends provided with hooks, the lower ends having laterally-extending hooks which pass through to the outside of the gate and are arranged and adapted to form handles for the rod, common pivots on each side of the wagon-body, and keepers on the gate, substantially as described.

2. In an end-gate for wagons, a gate proper having side flanges adapted to overlap the end of the wagon-body, in combination with a pair of long rods for supporting the outer or free end of the gate, a pair of shorter supporting-rods for supporting the lower or inner end of the gate, the latter having their opposite ends provided with hooks, the lower ends having laterally-extending hooks which pass through to the outside of the gate and are arranged and adapted to form handles for the rod, keepers for engaging the hanger-rods, and pivots or studs on the sides of the wagon-body over which the hooks, on the free ends of each pair of rods, pass, substantially as described.

3. The herein-described end-gate for wagons, consisting of a gate proper provided with side flanges adapted to overlap the end of the wagon-body, in combination with a pair of short hanger-rods, such as $g$, provided with laterally-projecting handles, a pair of longer supporting-rods $k$, each being provided with a curvature, keepers $o$, on the gate, and a pivot on each side of the wagon-body common to the free ends of each pair of the rods, substantially as described.

4. The herein-described end-gate for wagons consisting of a gate proper provided with side flanges adapted to overlap the end of the wagon-body, in combination with a pair of short hanger-rods, such as $g$, a pair of hanger-rods $k$, each being provided with a curvature, keepers $o$, on the gate, and a pivot on each side of the wagon-body common to each pair of the rods, said pivots constituting fulcrums for the longer hanger-rods, substantially as described.

In witness whereof I affix my signature in presence of two witnesses.

DANIEL WILDE.

Witnesses:
 CHAS. YOUNG,
 E. C. YOUNG.